United States Patent [19]

O'Neill

[11] Patent Number: 4,869,888

[45] Date of Patent: Sep. 26, 1989

[54] AMMONIA PRODUCTION PROCESS UTILIZING ENHANCED BOILING SURFACE IN REFRIGERATION ZONE

[75] Inventor: Patrick S. O'Neill, Williamsville, N.Y.

[73] Assignee: UOP, Des Plaines, Ill.

[21] Appl. No.: 174,970

[22] Filed: Mar. 29, 1988

[51] Int. Cl.[4] .............................................. C01C 1/04
[52] U.S. Cl. ................................................... 423/359
[58] Field of Search ......................................... 423/359

[56] References Cited

U.S. PATENT DOCUMENTS

| | | | |
|---|---|---|---|
| 1,750,649 | 3/1930 | Richardson | 423/359 |
| 1,815,243 | 7/1931 | De Jahn | 423/359 |
| 3,384,154 | 5/1968 | Milton | 165/133 |
| 4060125 | 11/1977 | Fujie et al | 165/133 |
| 4064914 | 12/1977 | Grant | 165/180 |
| 4,216,826 | 8/1980 | Fujikake | 165/133 |
| 4,479,925 | 10/1984 | Shires et al. | 423/359 |

*Primary Examiner*—John Doll
*Assistant Examiner*—Wayne A. Langel
*Attorney, Agent, or Firm*—Thomas K. McBride; John G. Tolomei; John G. Cutts, Jr.

[57] ABSTRACT

This invention pertains to the field of producing ammonia. More specifically, the present invention relates to reducing the costs of producing a unit amount of ammonia, particularly the energy costs, by the utilization of an enhanced boiling surface in the refrigeration zone of the process.

35 Claims, 1 Drawing Sheet

AMMONIA PRODUCTION PROCESS UTILIZING ENHANCED BOILING SURFACE IN REFRIGERATION ZONE

BACKGROUND OF THE INVENTION

1. Field of the Invention

This invention pertains to the field of producing ammonia. More specifically, the present invention relates to reducing the costs of producing a unit amount of ammonia, particularly the energy costs, by the utilization of an enhanced boiling surface in the refrigeration zone of the process.

2. Discussion of Related Art

Ammonia is produced in large quantities throughout the world. Most of the current production processes in use involve the reaction of hydrogen and nitrogen at high pressure. Indeed, the synthesis of ammonia from hydrogen and nitrogen was the first chemical reaction to be carried out under high pressure on an industrial scale.

The reaction of nitrogen and hydrogen to form ammonia takes place in the gas phase and proceeds with a decrease in volume. Accordingly, the equilibrium conversion or yield is favored by high pressure and/or low temperature, as one skilled in the art would readily appreciate. Typically, the pressure in the ammonia synthesis process is in the range of from about 1,000 to 2,200 psia, or higher.

Generally, an ammonia synthesis gas mixture comprising a stoichiometric amount of hydrogen and nitrogen (3:1) is first compressed in a synthesis gas compressor to the required high pressure and then passed to a converter reactor. In the converter, with the aid of an appropriate catalyst, the synthesis gas is reacted to form gaseous ammonia, typically in an amount of from about 9 to 11 mole percent ammonia. The ammonia is generally recovered from the reacted synthesis gas mixture by a series of ammonia refrigerated chillers connected in series, which condense the gaseous ammonia product between its dewpoint (about 75° F. for a stream containing about 9.5 mole % ammonia at 2100 psia) and about −10° F., using ammonia refrigeration as low as −28° F.

The ammonia refrigeration is provided by an ammonia refrigeration multistage compressor. The total power expended by this compressor is the sum of the power consumed by each stage of the compressor, respectively, which is directly proportional to the flow through each stage and is exponentially proportional to the pressure ratio across each stage.

Following condensation, the separated liquid ammonia is purged of any dissolved gases, and stored either as a liquid, or piped as a gas to the end user.

At the above noted pressure levels, the ammonia in the reacted synthesis gas stream begins to condense at about 75° F., and at −10° F. about 80% of all of the ammonia present in the stream will have condensed. If the reacted synthesis gas is further cooled to −25° F. (about the limit for a refrigeration system based on ammonia as the refrigerant), then about 87% of the ammonia contained in the synthesis gas will have condensed. For a synthesis gas containing about 9.5 mole % of ammonia, a recovery of 87% represents the upper practical value of recovery based on the given refrigeration system.

Some commercial processes recover yet additional ammonia by vaporizing ammonia refrigerant under vacuum to achieve still lower temperatures. Typically, however, the lowest refrigeration level is limited to about −28° F., the normal boiling point of pure ammonia at atmospheric pressure.

As in any production process, there is a desire to reduce the costs associated with the production of the ammonia while at the same time, seek a greater output of ammonia product. While this is an admirable objective, it is not always easily obtainable.

As is apparent from the above, there are essentially three main constituents in the ammonia synthesis process, namely, the converter reactor, the synthesis gas and refrigeration compressors, and the ammonia refrigeration chillers.

In general, the common approach to improving the ammonia synthesis process is to attempt to upgrade the converter. In this manner, the reaction produces a reacted synthesis gas having a larger concentration of ammonia, i.e., a greater reaction yield is obtained. An increase in ammonia concentration, however, as understood by those skilled in the art, corresponds to a similar increase in the loading and power consumption of the refrigeration system which usually requires the addition of a larger driver for the compressor.

Since the multistage compressor is a highly expensive piece of machinery involving not only a high initial capital cost but also high operating costs as well, the expected need to increase overall power consumption to accomodate such an added increase in ammonia production may not always be desirable.

As to the compressors, they are usually sized to accomodate particular design considerations for the specific process including flows, temperatures, pressures, etc., and will usually operate at a constant required amount of power consumption for the given process. The power consumption of a compressor, such as the multistage refrigeration compressor, is directly related to the flow across each stage of the compressor as well as the pressure ratio across each stage, which are both generally a function of the amount of ammonia being produced. Thus, the more ammonia being produced, it is generally expected that the more energy will be expended by the compressors.

With respect to the refrigeration chillers, which are typically shell and tube type heat exchangers, because of the high operating pressures involved in the ammonia synthesis process, these chillers are generally expensive to construct and require high pressure closures on their heads and channels. One common type of chiller uses all welded construction with no gasketed channel covers to prevent leakage.

Due to the high pressures, it is also desirable to keep the chillers relatively small to minimize metal thickness on the tubesheets and channel barrels. It is also desirable to avoid splitting a particular stage of chilling to more than one shell so as to avoid phase separation and temperature maldistribution on the synthesis gas side which adversely affects ammonia recovery. Moreover, leakage and piping costs are minimized if only one shell is used for each of the chilling stages.

A final requirement in the design of the synthesis gas chillers is to maintain sufficient temperature difference between the condensing ammonia and the boiling refrigerant ammonia. Typically, these chillers have cold end temperature approaches of about 15° to 20° F. The phrase "cold end temperature approach" is meant to specify the difference in temperature between the cooled reacted synthesis gas leaving the chiller and the ammonia refrigerant vaporizing in the chiller.

While lowering the cold end temperature approach would permit more ammonia to be recovered, it would also simultaneously and undesirably require larger, more expensive chillers or, alternatively, more than one chiller in parallel per stage, in order to do so. The combination of greatly accelerating costs with surface area and the adverse effects of flow maldistribution in parallel units, are factors which have lead away from design of such chillers with cold end temperature approaches less than 15° to 20° F. in ammonia plants commonly built in the 1960s and 1970s.

While an attempt has been made to improve the efficiency of the ammonia production in process by using a plate-fin or plate frame type of exchanger in the chillers in order to increase the surface area per unit volume of exchanger, such as is disclosed in U.S. Pat. No. 4,689,208, such an approach has the primary disadvantage of being limited in operating pressure to relatively lower pressures which, as noted above, does not favor the synthesis reaciton.

A need clearly exists therefore, to improve the ammonia production process, particulary to decrease the amount of energy expended to produce a unit amount of ammonia.

SUMMARY OF THE INVENTION

Applicant has discovered an improvement in an ammonia production process which improvement is able to indeed reduce the costs associated with the production of a unit amount of ammonia.

Significantly, by means of the present invention, it is now possible to increase the amount of ammonia recovered while still reducing the amount of energy expended per unit of ammonia produced. Alternatively, by means of the present invention, an ammonia production process may be improved by keeping the amount of ammonia produced constant while significantly reducing the amount of refrigeration compressor power needed to supply the required refrigerant at the proper temperatures thereby once again, reduce the amount of energy expended per unit of ammonia produced.

In particular, Applicant has discovered that the above features can be accomplished by utilizing an enhanced nucleate boiling surface tube within at least the last ammonia refrigerant chilling stage such that the enhanced surface is in contact with the ammonia refrigerant. Such enhanced boiling surfaces are well known and are available, for example, under the tradename High Flux tubes from Union Carbide Corporation, Danbury, Connecticut.

In contrast to what would generally be believed in the art, by virtue of the present invention, significantly more ammonia production may be obtained without, however, increasing the overall power expended per unit of ammonia produced, or increasing the areas of any of the heat exchangers in the ammonia synthesis gas/refrigeration process loop.

Indeed, in a typical ammonia plant, by retrofitting and replacing the existing bare tubes of the refrigeration chillers with enhanced nucleate boiling surface tubes such as High Flux, with an equal area substitution such that the existing chillers may be used. without the need to add new chillers or enlarging the old chillers, in accordance with the present invention, it is actually possible to recover an additional 5% more ammonia production. Most importantly, such additional production is accompanied with no increase in overall power consumption such that the energy expended per unit amount of ammonia produced is significantly reduced.

The additional ammonia recovery is primarily obtained by reducing the reacted synthesis gas to temperatures well below the typical recovery condensation temperatures employed in the prior art. Thus, whereas typical ammonia production processes will chill the reacted synthesis gas to a temperature of about $-10°$ F., by means of the present invention, it is now possible to reduce the chilling temperatures such that the ammonia synthesis gas is cooled to a temperature of as low as $-23°$ F.

However, the ability to obtain more ammonia production by lowering the chilling temperatures to these levels is a direction which is antithetical to the thinking by those skilled in this art due to the general belief that a point of diminishing returns would have been past caused by the unfavorable tradeoff between ammonia recovery and added compressor power or surface area. While such a concern may be valid for chillers using conventional bare tubing, Applicant has discovered that the utilization of an enhanced heat transfer surface within the chillers obviates such problems and, in fact, provides additional advantages which are totally unexpected and unappreciated.

Thus, only by providing an enhanced nucleate boiling surface in at least the largest chilling stage of the ammonia refrigerant chilling zone, generally in the last chilling stage, and most preferably, by providing such an enhanced surface in all of the respective chilling stages, it is possible to reduce the cold end temperature approach to within 3° F. of the ammonia refrigerant. By doing so, as well as preferably diverting a greater percentage of the relatively warm reacted synthesis gas to a gas/gas feed/effluent-type heat exchanger used to recover refrigeration from the lean recycled, uncondensed reacted synthesis gas (which will be discussed more fully hereinbelow), then at least an additional 5% ammonia can be recovered from the synthesis loop without increasing the power consumption of the ammonia refrigeration compressor or increasing the surface area in refrigeration recovery gas/gas heat exchanger.

In processes which are limited to constant ammonia production by limitations external to the synthesis gas loop, the improved synthesis gas chillers may be used to increase the temperature and operating pressure levels of the ammonia refrigeration system. The result is a decrease in the overall power consumption of the refrigeration compressor by at least 15%.

In an alternative embodiment of the present invention, if the improved synthesis gas chillers are used in a process where the amount of ammonia in the synthesis gas is increased by, for example, modifying the converter reactor such that the amount of ammonia is increased to about 10.5 mole % instead of the typical 9.5 mole %, then significantly more ammonia may be recovered as a consequence of cooling the richer stream further due to the smaller cold end temperature approach on such improved chillers. As a result, about 15% to 20% more ammonia may be recovered without increasing the overall power consumption of either the synthesis gas or refrigeration compressor, or the surface area of any of the gas/gas heat exchangers in the loop.

Still further, in yet another embodiment of the present invention, if ammonia production is limited to a constant value by limitations outside of the synthesis loop, then the improved synthesis gas chillers of the present invention may be used to reduce the recirculation rate of the synthesis gas stream to the gas/gas feed-/effluent-type heat exchanger noted above and yet recover the same amount of ammonia product. Thus, for a synthesis gas stream containing about 9.5 mole % ammonia, the power consumption of the synthesis gas compressor can be reduced, by virtue of the present invention, about 5%, without increasing the power consumption of the refrigeration compressor or increasing the surface area of any of the gas/gas heat exchangers in the synthesis loop.

Of course, all of the above noted features of the present invention may be obtained alone or in combination with one another in various degrees of improvement to the overall process.

Although the improved chiller bundle of the present invention utilizing an enhanced nucleate boiling surface may be used in both a new or existing plant environment, the most useful application of this invention would be to retrofit existing ammonia plants to replace the conventional bare tubes in the chiller heat exchangers with the enhanced boiling surfaces. In this manner, without doing anything else to the entire ammonia synthesis loop, such as changing the synthesis gas or refrigeration compressors or enlarging any of the heat exchangers, ammonia production may be increased, power consumption may be decreased, or a combination of these two phenomena may be had, such that the overall effect with any of these alternatives, is an overall decrease in the amount of energy, i.e., the costs, associated with the production of a unit amount of ammonia.

DETAILED DESCRIPTION OF THE INVENTION

Figure 1:
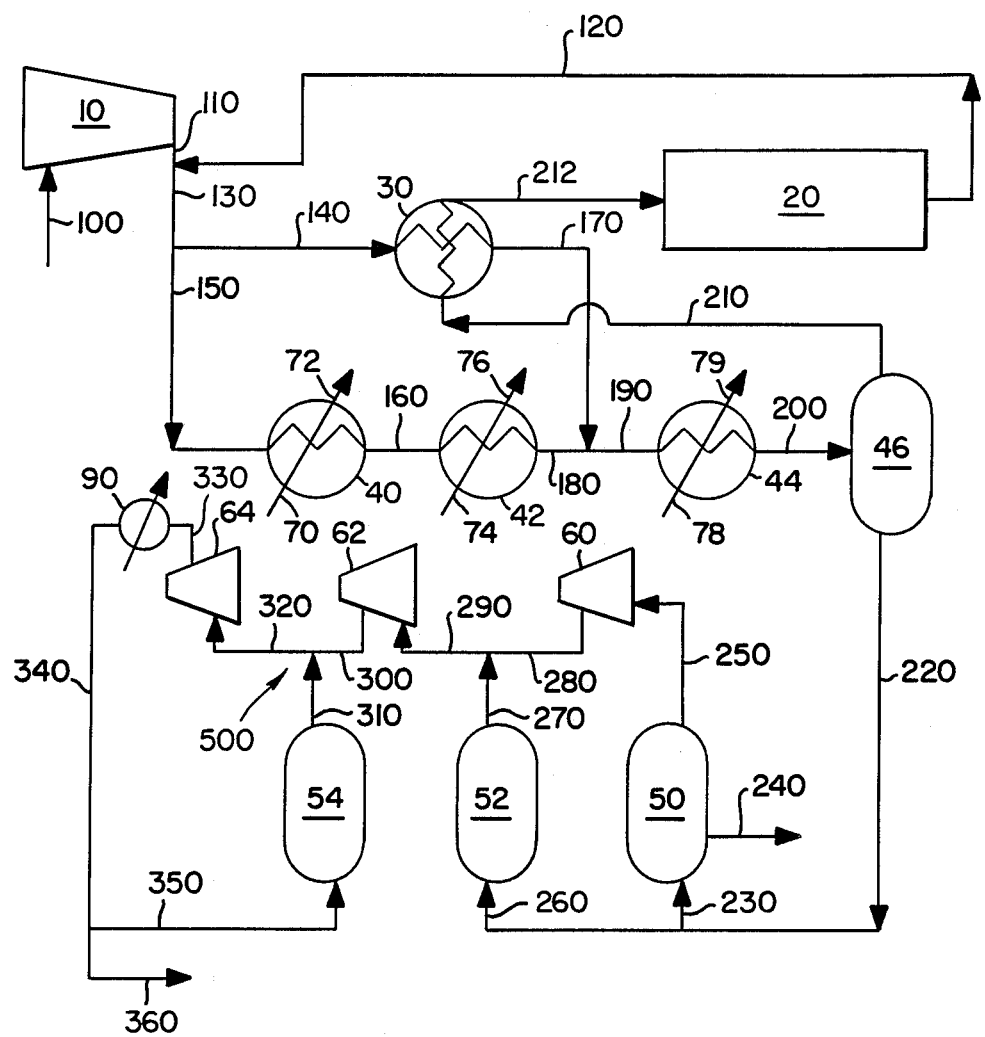
FIG. 1 is a schematic flow diagram of one embodiment of the present invention showing an ammonia synthesis loop containing an ammonia synthesis converter reactor and an ammonia refrigeration system for recovering the formed ammonia from the reacted synthesis gas, which ammonia refrigeration system contains enhanced nucleate boiling surfaces for contact with the ammonia refrigerant.

By providing an enhanced nucleate boiling surface to a chilling stage of the ammonia refrigeration system, the overall heat transfer coefficient of the exchanger increases by an amount of at least about 2 to 3 times. Thus, typical ammonia refrigeration chiller units containing conventional bare tube bundles have an overall heat transfer coefficient generally in the range of from about 125 to about 150 (BTU/hr)/(ft$^2$ ° F.). By utilizing an enhanced heat transfer surface in such chiller units, the overall heat transfer coefficient is increased to be in the range of at least about 350 to 500 (BTU/hr)/(ft$^2$ ° F.). It is due to this increase in overall heat transfer coefficient that all of the features of the present invention are obtainable. However, the ability to obtain these advantageous and desirable features are not at all obvious from the mere utilization of such an enhanced heat transfer surface.

Enhanced boiling surface heat exchange tubes are discussed in, for example, U.S. Pat. Nos. 3,384,154, 3,821,018, 4,064,914, 4,060,125, 3,906,604, 4,216,826, and 3,454,081, all of which are incorporated herein by reference as if set out in full.

These enhanced tubes are made in a variety of different ways which are well known to those skilled in the art. For example, such tubes may comprise annular or spiral cavities extending along the tube surface made by mechanical working of the tube. Alternatively, fins may be provided on the surface. So too, the tubes may be scored to provide ribs, grooves, a porous layer, and the like.

Generally, the more efficient enhanced tubes are those having a porous layer on the boiling side of the tube which can be provided in a number of different ways well known to those skilled in the art. In one such method, as described in U.S. Pat. No. 4,064,914, the porous boiling layer is bonded to one side of a thermally conductive wall. The porous boiling layer is made of thermally conductive particles bonded together to form interconnected pores of capillary size having an equivalent pore radius of less than about 6.0 mils, and preferably less than about 4.5 mils. As used herein, the phrase "equivalent pore radius" empirically defines a porous boiling surface layer having varied pore sizes and non-uniform pore configurtions in terms of an average uniform pore dimension. Such an enhanced tube containing a porous boiling layer is found in the High Flux tubing noted earlier.

An essential characterisitic of the porous surface layer is the interconnected pores of capillary size, some of which communicate with the outer surface. Liquid to be boiled enters the subsurface cavities through the outer pores and subsurface interconnecting pores, and is heated by the metal forming the walls of the cavities. At least part of the liquid is vaporized within the cavity and resulting bubbles grow against the cavity walls. A part thereof eventually emerges from the cavity through the outer pores and then rises through the liquid film over the porous layer for disengagement into the gas space over the liquid film. Additional liquid flows into the cavity from the interconnecting pores and the mechanism is continuously repeated.

By utilizing this enhanced boiling surface tubing containing a porous boiling layer, the boiling film heat transfer coefficient of the boiling fluid within the tubes is increased by a factor of about 10, typically to a value of about 2,000 to 5,000 (BTU/hr)/(ft$^2$ ° F.) or more, the exact improvement depending on the heat flux. This is due to the fact that the heat leaving the base metal surface of the tube does not have to travel through an appreciable liquid layer before meeting a vapor-liquid surface producing evaporation. Within the porous layer, a multitude of bubbles are grown so that the heat, in order to reach a vapor-liquid boundary, need travel only through an extremely thin liquid layer having a thickness considerably less than the minute diameter of the confining pore. Vaporization of the liquid takes place entirely within the pores.

In a process for producing ammonia, a synthesis gas must first be prepared which contains at least three moles of hydrogen for each mole of nitrogen for the following reaction to occur:

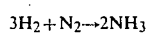

$$3H_2 + N_2 \rightarrow 2NH_3$$

The source of hydrogen is most commonly a hydrocarbon and the source of nitrogen is usually air or an air separation apparatus, which is able to remove both oxygen and water vapor.

The common commercial processes for producing the raw synthesis gas are steam reforming and partial oxidation (including coal gasification) although other procesess may be employed to produce the raw synthesis gas. A wide variety of hydrocarbon and carbon-hydrogen containing feeds may be employed to produce the raw synthesis gas ranging from normally gaseous material to solid materials.

In the first step for the preparation of the raw synthesis gas, the hydrocarbon material is usually first treated to remove acid gases such as hydrogen sulfide and other sulfur-bearing compounds which act as catalyst poisons. After this acid gas removal step, the feed material is then ready for reforming, which may be accomplished by steam reforming, partial oxidation, or a combination of these two techniques.

In the steam reforming step, hydrocarbons are contacted with steam in the presence of a steam reforming catalyst under conditions which favor the production of a raw hydrogen-rich gas. Gaseous hydrocarbons, or liquid hydrocarbons which can be placed in the gaseous form, such as natural gas, LPG or naphthas boling in the gasoline region, and steam are passed through tubes containing steam reforming catalyst in the primary reforming process. Since the primary reforming process is endothermic, heat is supplied to the reactor.

In the partial oxidation process, which may follow the steam reforming step or be used alone, hydrocarbons are contacted with commercially pure oxygen or enriched air and usualy some steam in the absence of a catalyst under conditions which favor the production of a raw hydrogen-rich gas. The hydrocarbon feeds which may be employed in partial oxidation are usually the heaviar feeds such as crude oil, residual oils and coal.

The details of reforming are well known to those skilled in the art and the conventional techniques for carrying out these steps are applicable in the present invention in order to provide the ammonia synthesis gas.

The raw synthesis gas obtained from the reforming steps comprises hydrogen, nitrogen and carbon monoxide together with a number of still other gases. This gas is then conventionally subjected to a carbon monoxide shift conversion step to convert the carbon monoxide present in the raw synthesis gas to carbon dioxide and additional hydrogen by reaction with steam in the presence of a catalyst by the water gas shift conversion reaction:

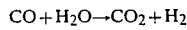

$$CO + H_2O \rightarrow CO_2 + H_2$$

The excess carbon dioxide which is produced in the shift conversion step is generally removed by subjecting the effluent from this step to a selective sorbent such as a liquid scrubbing solution of hot carbonate or amine solutions, or the like.

Finally, after removal of the carbon dioxide, the scrubbed gas is further treated to purify the gas and to produce the desired synthesis gas. The composition of the effluent from the carbon dioxide scrubbing process is hydrogen and nitrogen in the proper stoichiometric ratio together with a small amount of carbon oxides. Since the carbon oxides are poisons to the ammonia synthesis catalysts, these gases are reacted with hydrogen in a methanation process to produce methane and steam. Besides a methanation process, the scrubbed gas may be treated with molecular sieves to remove impurities in the gas including water or the raw synthesis gas recovered from the methanation process is cooled to condense out the water formed. The final synthesis gas mixture contains hydrogen and nitrogen in approximately a 3:1 ratio, and about 10 percent methane and argon which act as diluents and must eventually be purged from the process.

The synthesis gas is now ready to enter the ammonia synthesis loop in which the ammonia is actually formed and recovered as product.

The reaction of nitrogen and hydrogen to form ammonia takes place in the gas phase and proceeds with a decrease in volume. For this reason, the equilibrium conversion or yield is favored by high pressure or low temperature. The reaction proceeds slowly and requires a catalyst. Most commercial processes in practice today carry out the catalytic conversion step between about 450° and 600° C. Earlier plants carried out the synthesis of the ammonia at pressures from about 200 to about 1000 atmospheres. Plants built since the late 1960s, however, have tended to operate at pressures below 250 atmospheres, which are more economical to operate despite the lower equilibrium yields.

Reaction kinetics dictate a relationship between conversion of ammonia and reactor space velocity. The actual reactor yield is lower than the equilibrium value, but approaches it when the value expected to lower than 15 to 20%.

Reference is now made to FIG. 1 in which a specific embodiment of the present invention is shown schematically depicting a particular type of ammonia synthesis loop. Although the following discussion will be based primarily on this ammonia synthesis loop, to which the present invention is particularly applicable, the present invention is in no way limited to only this synthesis loop and is applicable to any ammonia synthesis process utilizing an ammonia refrigeration recovery system wherein the conventional bare tube bundles are replaced with enhanced boiling heat transfer surfaces such that the advantages of the present invention may be realized.

The synthesis gas 100 containing the hydrogen and nitrogen in the 3:1 ratio prepared in the manner discussed above enters the ammonia synthesis loop by first being introduced to synthesis gas compressor 10. In this synthesis gas compressor, the synthesis gas is compressed to a pressure of from about 1,200 to about 2,200 psia, typically about 2,100 psia. The precise pressure to which the synthesis gas is compressed is not critical to the present invention and is conventional in the art. Most desirably, however, the pressure is in the range of from about 1,900 psia to 2,200 psia, the higher end of the broader range noted above due to the ammonia synthesis reaction favoring high pressure and the cooling limitations of the ammonia refrigeration system which is also dependent upon pressure.

The compressed synthesis gas leaves compressor 10 via line 110 and is combined with reacted synthesis gas containing gaseous ammonia within line 120 leaving converter 20 to form a combined stream in line 130. Although not shown, reacted synthesis gas in line 120 is increased to the desired pressure by means of a booster compressor to compensate for the pressure drop in the system prior to its being combined with the compressed synthesis gas. The combined stream is then generally cooled in a heat exchanger (not shown) to about 100° F. using cooling water.

The cooled combined stream of fresh synthesis gas and reacted synthesis gas is then split into streams 140 and 150. Generally, these streams are split about equally such that approximately one-half of the stream, conventionally known as the bypass stream, enters refrigeration recuperator 30 and the other half of the combined stream enters the first stage 40 of the ammonia refrigeration chilling zone.

Recuperator 30 is a gas/gas heat exchanger used to recover refrigeration from the lean recycled, uncondensed reacted synthesis gas contained within line 210 leaving gas/liquid separator 46 such that the portion of the combined synthesis gas stream contained within line 140, the bypass stream, is cooled prior to its entering the ammonia refrigeration zone. Typically, the bypass stream is cooled from a temperature of about 100° F. to a temperature in the range of from about 15° to 28° F., generally about 20° F., depending upon the amount of flow in lines 140 and 210, respectively.

In first chilling stage 40, the combined synthesis gas stream containing gaseous ammonia is cooled below the dew point temperature of the gaseous ammonia so as to condense at least a portion of this gaseous ammonia by indirect heat exchange with liquid ammonia entering at line 70. As the liquid ammonia refrigerant indirectly contacts the warmer synthesis gas mixture, it boils thereby removing heat of vaporization from the synthesis gas mixture causing cooling which leads to condensation of ammonia product. Vaporous ammonia refrigerant leaves chilling stage 40 at line 72.

The cooled and partially condensed synthesis gas stream leaves first chilling stage 40 at line 160 and then enters the second chilling stage 42. In chilling stage 42, the synthesis gas mixture is still further chilled by liquid ammonia refrigerant entering line 74 which leaves at as gaseous ammonia at line 76 to condense at least a further portion of the vaporous ammonia contained within the combined synthesis gas mixture.

The further cooled synthesis gas mixture leaves the second chilling stage 42 at line 180 and is combined with the cooled bypass synthesis gas mixture leaving the recuperator at line 170 to form a recombined synthesis gas mixture at line 190 which is then fed to the last and largest chilling stage 44. Chilling stage 44 is understandably larger that either of the preceeding chilling stages due to the larger flowrate that it handles.

For a plant producing about 1,200 metric tons of ammonia per day, for example, at a pressure of 2,100 psia, synthesis gas chillers 40 and 42 would have surface areas of about 2,000 to 3,000 ft$^2$ and 4,000 to 5,000 ft$^2$, respectively. Chilling stage 44, however, the largest and most important of the chilling stages, would have a surface area of about 7,000 to 8,000 ft$^2$.

Although FIG. 1 shows a total of three chilling stages, which is the conventional number employed in commercial plants, any number of chilling stages may be employed in the present invention as long as there are at least two such units. What is required in order to practice the present invention is that at least the last chilling stage contain the enhanced nucleate boiling surface area. Most preferably, all of the chilling stages are equipped with such enhanced nucleate boiling surfaces so as to provide optimum results.

Chilling stage 44, cooled by liquid ammonia entering the chiller at line 78 and leaving as vaporous ammonia at line 79, cools the ammonia synthesis gas to its coldest temperature within the refrigeration zone.

Since all of the chillers operate at temperatures which are below the dewpoint of the ammonia in the synthesis gas, varying amounts of ammonia are condensed in the train of chillers. Typically, about 25 to 40% and generally about 30% of the product ammonia is condensed within chilling stages 40 and 42. About 35 to 50% and generally about 40% of the product ammonia is condensed in recuperator 30. The remainder of the ammonia that is capable of being condensed is condensed in the last chilling stage 44. As noted earlier, not all of the gaseous ammonia contained within the reacted synthesis gas will be recovered in the refrigeration zone of the synthesis loop. Thus, at $-10°$ F., about 80% of all of the ammonia present in the stream will have condensed. If the reacted synthesis gas is further cooled to $-25°$ F. (about the limit for a refrigeration system based on ammonia as the refrigerant), then about 87% of the ammonia contained in the synthesis gas will have condensed. For a synthesis gas containing about 9.5 mole % of ammonia, a recovery of 87% represents the upper practical value of recovery based on the given refrigeration system.

Accordingly, stream 200 leaving chilling stage 44 contains liquid ammonia product which was condensed in recuperator 30 and chilling stages 40, 42 and 44, as well as uncondensed vaporous ammonia, unreacted hydrogen and nitrogen, as well as the various other diluent gases, such as the argon, etc., discussed earlier. This liquid/vapor mixture is introduced to separator 46 where the liquid ammonia is separated from the remaining constituents and passed to line 220. The lean, uncondensed synthesis gas mixture leaves gas/liquid separator 46 at line 210 and is recycled back to converter reactor 20 for further synthesis reaction to ammonia via recuperator 30 such that its refrigeration is recovered by bypass stream 140 as discussed above.

The bypass flow in line 140 and the surface area within recuperator 30 used for the recovery of the refrigeration of the synthesis gas in line 210 are sized such that the lean, synthesis gas being recycled to converter 20 at line 212 is at ambient temperature, typically about 75° F.

The catalytic converter 20 is a conventional ammonia synthesis reactor which is well known to those skilled in the art and need not be described in detail here. The synthesis gas entering the converter generally still has about 1 to 3% ammonia contained therein.

Any ammonia synthesis catalyst may be employed as is conventional in the art. Such catalysts include, for example, well known iron or modified iron synthesis catalysts. When using such catalysts, the ammonia synthesis reaction is generally carried at temperatures in the range of from about 260° to 540° C., preferably between about 315° to about 425° C. Reference is made to U.S. Pat. Nos. 3,475,136 and 3,576,404 which discuss this ammonia synthesis reaction in greater detail, the contents of which are incorporated herein.

The yield of the converter is such that there is only about 8 to 13 mole %, typically 9.5 mole %, of formed ammonia in the reacted synthesis gas leaving converter 20 at line 120.

In the embodiment shown in FIG. 1, the liquid product ammonia contained in line 220 is introduced to the ammonia refrigeration system shown generally as 500 for use as the ammonia refrigerant in each of the chilling stages. Although this is the preferred manner in which to operate the chillers, it is not necessary to the present invention that the source of ammonia be derived from product stream 220 as shown herein.

Refrigeration system 500 is comprised of 3 stages wherein each stage consists of a compression stage, a corresponding flash chamber, and a corresponding chilling stage. The compression stages are generally all part of a multistage compressor in which there is one common drive shaft to drive all of the compression stages powered by an electric motor or more preferably, by a steam turbine. Although this type of multistage compressor is typically found in existing ammonia production plants, it is not critical to the present invention that such a multistage compressor be used although the features of the present invention are indeed most applicable to such a compressor. So too, it is not necessary that there be three stages in the refrigeration system. More or less stages may be employed provided that the system is still capable of doing what it is intended to do, i.e., recover the desired amount of product ammonia.

More particularly, the liquid ammonia leaving separator 46 in line 220 is generally split about equally into streams 230 and 260, and introduced into flash chambers 50 and 52, respectively. Liquid ammonia product is removed from flash chamber 50 at line 240.

Although not shown for simplicity of the diagram, a liquid ammonia stream leaves flash chamber 50 and is introduced into line 78 as the refrigerant for chilling stage 44. Also not shown, the vaporous ammonia refrigerant leaving at line 79 is reintroduced back into flash chamber 50. The flashed vapors in flash chamber 50 as well as the vaporous ammonia returned to the flash chamber from line 79 are introduced into the first compression stage 60 via line 250. These ammonia vapors are partially compressed and discharged at line 280.

Simultaneously, the liquid ammonia from line 260 is flashed in flash chamber 52 to produce flashed vapors. As in flash chamber 50, a liquid ammonia refrigerant stream from flash chamber 52 (not shown) is fed to line 74 of chilling stage 42. The boiled, vaporous ammonia leaving at line 76 is reintroduced (not shown) to flash chamber 52. These boiled ammonia vapors as well as the flashed vapors leave flash chamber 52 at line 270 and combine with the compressed vapors of line 280 to form an inlet stream 290 to the second stage of compression, compression stage 62.

At compression stage 62, the ammonia vapors are further compressed and discharged at line 300 where they combine with the ammonia vapors from line 310 originating from flash chamber 54 to enter line 320. The combined vapors at line 320 are fed into the third stage of compression, compression stage 64. Here, the vapors are compressed to their final value, generally to about 200 to 300 psia, typically, about 270 psia and discharged at line 330.

The discharged compressed stream of ammonia is then water cooled in heat exchanger 90 to a temperatue of about 80° to about 110° F., typically about 100° F., to form liquid ammonia in line 340. A portion of the liquid ammonia is removed as product at line 360 and the remainder is introduced to flash chamber 54.

Flash chamber 50, compression stage 60 and chilling stage 44 are all interrelated and actually form one overall stage of the refrigeration system. The temperatures, pressures, and flows in this first stage all have an effect upon each other. Thus, the suction pressure at compression stage 60 determines the pressure in flash chamber 50. This pressure controls the temperature of the liquid ammonia leaving as refrigerant to chiller 44. In a similar manner, flash chamber 52, compression stage 62 and chilling stage 42 form another interrelated stage in the refrigeration system as does flash chamber 54, compression stage 64 and chiller 40.

The overall power consumed by the multistage compressor is determined by the flow rate through the various stages, and the compression ratio of each respective stage. Power per stage is directly proportional to the flow through the stage and is an exponential function of the pressure ratio across each respective stage, in accordance with well known relationships for isentropic compression. Compression efficiencies are typically 75 to 80%. For the typical 1200 metric ton per day plant, the refrigeration compressor is usually rated at about 13,000 to 16,000 HP, typically about 14,500 HP.

It is possible in a multistage compressor to maintain constant power consumption while increasing the mass flow of gas through the compressor, provided that the compression ratios of the individual stages are reduced or altered in proportion to the flow increase.

For example, if additional cooling is done in one of the chiller units, such as the last chilling stage 44, as a result of utilizing an enhanced boiling heat transfer surface therein which makes it possible to reduce the temperature of the reacted synthesis gas lower than is possible in prior art techniques, then more ammonia refrigerant will be vaporized in that chilling unit. As a result, the flow in the first stage of compression, namely, compression stage 60, will correspondingly increase, thus increasing the power consumption at that stage. However, if at the same time, the pressure levels at the second and third compression stages are increased by taking a closer or a reduced cold end temperature approach at the corresponding chilling units, then the compression ratios are reduced at those stages. By doing so, the total power consumption of the multistage compressor can actually be the same or lower than before. A critical feature in being able to increase the ammonia production without simultaneously increasing the total power consumption is by utilizing the boiling heat transfer surfaces in at least the last chilling stage, chiller 44.

In Table I below, a number of different examples are set forth in which High Flux tubing was utilized for each of the chilling units 40, 42 and 44 for a plant producing about 1200 metric tons of ammonia per day at a pressure of 2100 psia. Inasmuch as recuperator 30 is a gas/gas exchanger, an enhanced surface area is not applicable there. Case 1 is not in accordance with the present invention and is the control base case. It shows how the ammonia synthesis loop shown in FIG. 1 would operate as in the prior art in which bare tubes are used in each of the chilling units.

In Case 2, in which all of the chilling units are equipped with High Flux tubing in accordance with the present invention, the conditions within the system are such so as to achieve the desired objective of recovering more ammonia. In contrast, Case 3, in which all of the chilling units are also equipped with High Flux tubing, shows the example in which the objective is to keep the amount of ammonia produced constant while reducing the amount of energy expended in the overall process. Finally, in Case 4, an example is set forth in which the converter is modified to increase the concentration of ammonia being formed in the converter in conjunction with the objective of obtaining more ammonia recovery in which, once again, all of the chiller units contain High Flux tubing. As will be seen, in each case which is in accordance with the present invention, however, the amount of energy expended to produce a unit amount of ammonia is always reduced.

TABLE I

NOMINAL 1200 METRIC TON/DAY PLANT

| | CASE 1 CONVENTIONAL BARE TUBE OPERATION | CASE 2 5% MORE AMMONIA | CASE 3 POWER SAVINGS | CASE 4 ENRICHED SYNGAS |
|---|---|---|---|---|
| TOTAL SYNGAS FLOW LB/HR (LINE 130) | 909,770 | 909,770 | 909,770 | 955,261 |
| BYPASS FLOW LB/HR (LINE 140) | 454,885 | 500,373 | 454,885 | 477,630 |
| AMMONIA RECOVERED LB/HR (LINE 220) | 109,260 | 115,425 | 109,260 | 128,709 |
| RECYCLE GAS FLOW 18/HR (LINE 210) | 800,510 | 794,346 | 800,510 | 826.553 |
| MOL PCT. AMMONIA IN SYNGAS (LINE 120) | 9.5 | 9.5 | 9.5 | 9.5 |
| HEAT DUTY | | | | |
| CHILLER 40 (MMBTU/HR) | 14.5 | 16.3 | 14.5 | 15.2 |
| CHILLER 42 (MMBTU/HR) | 21.6 | 16.7 | 21.6 | 20.4 |
| CHILLER 44 (MMBTU/HR) | 42.0 | 50.7 | 42.0 | 54.5 |
| RECUPERATOR 30 (MMBTU/HR) | 46.2 | 53.6 | 46.2 | 47.4 |
| SURFACE AREA | | | | |
| CHILLER 40 ($FT^2$) | 2,440 | 2,440 | 2,440 | 2,440 |
| CHILLER 42 ($FT^2$) | 4,560 | 4,560 | 4,560 | 4,560 |
| CHILLER 44 ($FT^2$) | 7,150 | 7,150 | 7,150 | 7,150 |
| RECUPERATOR 30 ($FT^2$) | 33,600 | 33,600 | 33,600 | 33,600 |
| OVERALL $U_o$ ($BTU/HR/FT^2/°F.$) | | | | |
| CHILLER 40 | 227 | 485 | 424 | 448 |
| CHILLER 42 | 146 | 350 | 419 | 302 |
| CHILLER 44 | 168 | 430 | 411 | 412 |
| RECUPERATOR 30 | 50 | 50 | 50 | 50 |
| AMMONIA REFRIGERANT BOILING TEMP °F./PRESS. PSIA | | | | |
| 1ST. STAGE. (LINE 78) | −28/15 | −26/15.9 | −13/22 | −13/22 |
| 2ND. STAGE (LINE 74) | +19/47 | +34/65 | +36/68 | +40/73 |
| 3RD. STAGE (LINE 70) | +56/100 | +62/114 | +66/120 | +70/129 |
| SYNGAS OUTLET TEMP °F. | | | | |
| 1ST. STAGE (LINE 160) | 70 | 65 | 70 | 75 |
| 2ND. STAGE (LINE 180) | 38 | 36 | 38 | 45 |
| 3RD. STAGE (LINE 200) | −9 | −23 | −9 | −9 |
| POWER | | | | |
| 1ST. STAGE (COMP. 60) HP | 2,749 | 4,131 | 2,781 | 3,806 |
| 2ND. STAGE (COMP. 62) HP | 3,826 | 3,114 | 2,874 | 3,639 |
| 3RD. STAGE (COMP. 64) HP | 8,007 | 7,303 | 6,265 | 6,828 |
| TOTAL REFRIG. POWER HP | 14,582 | 14,548 | 11,920 | 14,273 |

Turning more specifically to each of the Cases shown in the Table, in Case 1, which is typical of a conventional commercial ammonia production process and which is not in accordance with the present invention, a synthesis gas flowing at 909,770 lb/hr and containing 9.5 mole % ammonia is split in half, with one fraction going to the recuperator 30, and the other to the first chilling stage 40. The required heat duties, surface areas and overall heat transfer coefficients $U_o$ for each of the three bare tube chillers are shown. The refrigeration temperature level supplied by the ammonia refrigerant to each of the chillers is −28° F. in the last chilling stage, 19° F. in the second chilling stage, and 56° F. in the first chilling stage, so as to maintain the required mean temperature difference across the chillers. The power consumption of the ammonia compressor for each of the three stages, and the total compressor power is shown to be 14,582 HP. Ammonia recovery is 109,260 lb/hr, or nominally 1200 metric tons/day. Dividing the amount of ammonia produced by the total refrigeration power consumed, a value of 0.133 HP/lb of ammonia produced per hour.

In Case 2, by using High Flux tubing in accordance with the present invention, the amount of ammonia now recovered is 115,425 lbs/hr, an increase of 5 percent over the amount recovered with the bare tube chillers. Yet, as shown in the Table, the number of chillers were not increased nor was their surface areas, which remained constant, including that of the recuperator. As is shown, this increase in ammonia production is accompanied by a total refrigeration power consumption which is essentially equal to that of the bare tube case. As such, the amount of power consumed per pound of ammonia produced is actually reduced to 0.126 HP/lb of ammonia produced per hour which is made possible only by the use of the enhanced boiling heat transfer surface in the chillers.

More specifically, by having the High Flux tubing in the chillers, the cold end temperature approach is able to be at least 5° F. or less, preferably 3° F., as is shown for Case 2 where it is noted that where the boiling ammonia refrigerant is 62° F., the synthesis gas leaving the chiller was cooled to 65° F. Similarly, where the boiling ammonia refrigerant was at a temperature of 34° and −26° F., the synthesis gas was cooled to 36° and −23° F., respectively, demonstrating a cold end temperature approach of less than or equal to 3° F. Such a cold end temperature approach is made possible by the use of the High Flux tubing.

With such a small cold end temperature approach, and keeping the flow to the last chilling stage essentially constant, the synthesis gas leaving that last chilling stage is able to be cooled to a much lower temperature (−23° F. as compared to only −9° F. with bare tube) resulting in more ammonia being condensed.

Since the synthesis gas in Case 2 is cooled to such a lower temperature, the heat duties in recuperator 30 and the last chilling stage 44 must correspondingly increase. Thus, since the overall heat transfer coefficient in the recuperator and its area remain constant, the increased heat duty caused by the lower temperature of the recycle synthesis gas is desirably balanced with a larger bypass flow and an increased temperature difference in the recuperator.

The need to balance the recuperator with the larger bypass flow places a larger burden on the last chilling stage 44 by increasing its inlet temperature by about 7° F. and its heat duty. However, only because of the substantially higher $U_o$ values of the chilling units as a result of the High Flux tubing, about 350 to about 500 (BTU/hr)/(ft$^2$ ° F.), it is possible to raise the refrigeration temperature levels in each chilling stage despite the increased heat duties, and maintain constant power in the compressor.

The increased refrigeration temperatures result in higher suction pressures which, in turn, help decrease the compressor power ratios resulting in a decrease in power consumption. Accordingly, it is seen that while the power consumption has increased in the first compression stage, stage 60, due to the higher refrigeration load, the power was able to be decreased in the second and third compressor stages such that the overall compressor power expended remained substantially constant.

Turning now to Case 3, there the conditions within the system are such that the ammonia production is kept the same as in bare tube case 1, but most significantly, the amount of power consumption is most advantageously reduced. Thus, by increasing the suction pressure and temperature levels in each stage of the compressor, the amount of power (which is a function of the pressure ratio of discharge pressure to suction pressure) is reduced exponentially. However, increasing the amount of boiling ammonia refrigerant such that there is a lower mean temperature difference would not be possible without additional surface area unless each of the units are equipped with an enhanced boiling heat transfer surface such that the overall heat transfer coefficient is high enough to still accomodate the required heat duty of each of the chilling stages.

As is seen from the Table, the overall power consumption drops from 14,582 HP for bare tubes to 11,920 HP when High Flux tubing is employed. This results in a reduction of the power consumed per unit of ammonia produced to 0.109 HP/lb of ammonia produced per hour. The resulting power consumption is acutally about 20% lower than the amount of power needed to be expended in the conventional bare tube chillers.

Although not set forth in the Table, at constant ammonia production rates, the use of High Flux tubing in the chillers would also permit approximately a 5% decrease in the power consumption of the synthesis gas compressor 10 by reducing the amount of synthesis gas which must be circulated by 5%.

Case 4 shows the results of utilizing High Flux tubing in each of the chillers in accordance with the present invention in which a converter modification is also made such that the ammonia concentration in the synthesis gas stream leaving the converter is increased from 9.5 mole % to 10.5 mole %. In this example, the synthesis gas rate is also increased to about 955,000 lb/hr. The heat load on the last chilling stage 44 increases substantially, although the synthesis gas is cooled to only −9° F. Due to the presence of the High Flux tubing, the temperature and pressure levels in each of the compressor stages can all be increased. The net result is that the additional ammonia made available by the converter modification is recovered without having to change the surface area of the recuperator, or having to increase the overall power consumption of the refrigeration compressor. Here the recovery of an additional 16% more ammonia is made possible without having to exceed the power consumption of a conventional bare tube system. Here, the power consumed per unit of ammonia produced is reduced to 0.110 HP/lb of ammonia produced per hour.

While the examples in the Table all demonstrate the utilization of enhanced boiling heat transfer surface area in each of the chilling stages, it is not critical to the present invention that all of the stages are so equipped, although such is preferred. In accordance with the present invention, at least the last chilling stage contains the enhanced heat transfer surface area. Of course, with only one of a plurality of chilling stages employing the enhanced heat transfer surface area, it is to be expected that there will be a corresponding decrease in the performance levels shown in the Table. Thus, with only one stage having enhanced heat transfer surface area, it may not be possible to obtain an increase of 5% ammonia production while still keeping the overall power consumption constant. A lesser increase in ammonia production would be expected. Similar decreases in performance for the other cases would also occur. However, even with the use of High Flux in only the last chilling stage, the net results will still be such that there will be a decrease in the amount of energy expended per unit of ammonia produced as compared to conventional bare tube chillers.

It will be understood that these examples are merely illustrative and are not to be construed as limiting the invention in any manner.

Furthermore, it is also to be understood that various valves, pumps, controls and related auxiliary equipment are required to practice the present invention not all of which were depicted in the Figure. In the interest of simplicity, such items have not been shown or described since the need for them, their location and their manner of use are well known to those skilled in the art.

What is claimed is:

1. In a process for producing ammonia which comprises:
   (a) reacting a nitrogen-hydrogen ammonia synthesis gas stream in the presence of an ammonia synthesis catalyst at conditions effecting partial conversion to ammonia; and
   (b) cooling the reacted synthesis gas stream to a temperature below the dewpoint of ammonia so as to condense said ammonia by indirect heat exchange with ammonia refrigerant in at least two or more stages of cooling wherein each successive stage cools the reacted synthesis gas to a lower temperature with the last stage of cooling providing the lowest reacted synthesis gas temperature T, said indirect heat exchange having an overall heat transfer coefficient $U_o$, and wherein the ammonia refrigerant is provided by a compressor having at least two or more stages of compression, each stage of compression requiring a corresponding respective amount of compression energy to compress the ammonia such that a total amount of energy E is expended for compression and each stage of compression having an inlet suction pressure and an outlet discharge pressure;
   the improvement which comprises decreasing the amount of compression energy expended per unit amount of ammonia produced in the process by:

(i) providing heat exchange apparatus for cooling the reacted synthesis gas with ammonia refrigerant having a thermally conductive wall with an enhanced boiling surface on one side of said wall in at least the last stage of cooling such that the ammonia refrigerant is in contact with the said enhanced boiling surface during the indirect heat exchange; and (ii) increasing the suction pressure to at least the first stage of compression.

2. The process of claim 1, wherein the temperature T in the last stage of cooling is reduced to obtain more condensation of liquid ammonia product.

3. The process of claim 2, wherein the temperature T is reduced to a value in the range of from about −10° to about −25° F.

4. The process of claim 2, wherein the temperature T is reduced to a value in the range of from about −23° to about −25° F.

5. The process of claim 1, wherein the cold end temperature approach of the last stage of cooling is less than about 5° F.

6. The process of claim 5, wherein the cold end temperature approach of the last stage of cooling is less than or equal to about 3° F.

7. The process of claim 1, wherein the total amount of compressor energy E is reduced by maintaining the temperature T in the last cooling stage constant to thereby maintain the same level of ammonia condensation.

8. The process of claim 1, wherein all of the cooling stages are provided with an enhanced boiling surface such that the ammonia refrigerant is in contact with the said enhanced surface.

9. The process of claim 1, wherein the overall heat transfer coefficient $U_o$ is increased by a factor of from at least about 2.0 to about 3.0.

10. The process of claim 1, wherein the overall heat transfer coeffiicient $U_o$ is increased to a value of from about 250 to 500 (BTU/hr)/(ft$^2$ ° F.).

11. The process of claim 1, wherein the condensed ammonia product is utilized as the ammonia refrigerant.

12. The process of claim 1, wherein the pressure is in the range of from about 1,800 to about 2,300 psia.

13. The process of claim 12, wherein the pressure is in the range of from about 2,100 to 2,200 psia.

14. The process of claim 1, wherein the enhanced boiling surface is a porous boiling layer.

15. The process of claim 14, wherein the porous boiling layer is constructed of thermally conductive particles bonded together to form interconnected pores of capillary size having an equivalent pore radius of less than about 6.0 mils.

16. The process of claim 14, wherein the porous boiling layer is formed by mechanically working the wall surface.

17. The process of claim 1, wherein the enhanced boiling surface provides a boiling film heat transfer coefficient of greater than about 2,000 (BTU/hr)/(ft$^2$ ° F.).

18. The process of claim 1, wherein the suction pressure at each stage of the compressor is raised.

19. The method for decreasing energy expended per unit amount of ammonia produced in an ammonia production process which comprises:

(a) reacting a nitrogen-hydrogen ammonia synthesis gas stream in the presence of an ammonia synthesis catalyst at conditions effecting partial conversion to ammonia;

(b) passing the reacted synthesis gas containing gaseous ammonia through two or more stages of cooling by indirect heat exchange with ammonia refrigerant to a temperature below the dewpoint of the ammonia to obtain condensed ammonia product; wherein at least the last stage of cooling contains a thermally conductive wall with an enhanced boiling surface on the side which is in contact with the ammonia refrigerant, said last stage of cooling having an overall heat transfer coefficient $U_o$, and wherein the ammonia refrigerant is provided by a compressor having two or more stages of compression requiring an input of compression energy for each stage of compression, each stage of compression having an inlet suction pressure and an outlet discharge pressure;

(c) increasing the suction pressure to at least the first stage of the compressor such that a percentage increase in ammonia condensation is greater than the corresponding percentage increase in compressor energy consumption.

20. The process of claim 19, wherein the reacted synthesis gas is cooled to a temperature in the range of from about −10° to about −25° F.

21. The process of claim 19, wherein the cold end temperature approach of the last stage of cooling is less than about 5° F.

22. The process of claim 21, wherein the cold end temperature approach of the last stage of cooling is less than or equal to about 3° F.

23. The process of claim 19, wherein all of the cooling stages are provided with an enhanced boiling surface such that the ammonia refrigerant is in contact with the said enhanced surface.

24. The process of claim 19, wherein the overall heat transfer coefficient $U_o$ is in the range of from about 250 to 500 (BTU/hr)/(ft$^2$ ° F.).

25. The process of claim 19, wherein the condensed ammonia product is utilized as the ammonia refrigerant.

26. The process of claim 19, wherein the pressure is in the range of from about 1,800 to about 2,300 psia.

27. The process of claim 26, wherein the pressure is in the range of from about 2,100 to 2,200 psia.

28. The process of claim 19, wherein the enhanced boiling surface is a porous boiling layer.

29. The process of claim 28, wherein the porous boiling layer is constructed of thermally conductive particles bonded together to form interconnected pores of capillary size having an equivalent pore radius of less than about 6.0 mils.

30. The process of claim 28, wherein the porous boiling layer is formed by mechanically working the wall surface.

31. The process of claim 19, wherein the enhanced boiling surface provides a boiling film heat transfer coefficient of greater than about 2,000 (BTU/hr)/(ft$^2$ ° F.).

32. The process of claim 19, wherein the suction pressure at each stage of the compressor is raised.

33. In a process for producing ammonia which comprises:

(a) reacting a nitrogen-hydrogen ammonia synthesis gas stream in the presence of an ammonia synthesis catalyst at conditions effecting partial conversion to ammonia; and (b) cooling the reacted synthesis gas stream containing gaseous ammonia to a temperature T below the dewpoint of the ammonia to obtain a condensed liquid ammonia product by indirect heat exchange with ammonia refrigerant in at least two or more stages of cooling, wherein the ammonia refrigerant is provided by a compressor having at least two or more stages of compression, each stage of compression requiring a corresponding amount of compression energy to compress the ammonia;

the improvement which comprises reducing the energy expended per unit amount of ammonia produced by increasing the amount of ammonia condensed while maintaining or reducing the overall compressor energy consumption by:

(i) providing heat exchange apparatus for cooling the reacted synthesis gas with ammonia refrigerant having a thermally conductive wall with an enhanced boiling surface on one side of said wall in at least the last stage of cooling such that the ammonia refrigerant is in contact with the said enhanced boiling surface during the indirect heat exchange; and (ii) cooling the reacted synthesis gas to a temperature below T so as to condense more ammonia; and (iii) increasing the suction pressure in at least the first stage of the compressor so as to maintain or reduce the overall compressor energy consumption.

34. In a process for producing ammonia which comprises;

(a) reacting a nitrogen-hydrogen ammonia synthesis gas stream in the presence of an ammonia synthesis catalyst at conditions effecting partial conversion to ammonia; and (b) cooling the reacted synthesis gas stream containing gaseous ammonia to a temperature T below the dewpoint of the ammonia to obtain a condensed liquid ammonia product by indirect heat exchange with ammonia refrigerant in at least two or more stages of cooling, wherein the ammonia refrigerant is provided by a compressor having at least two or more stages of compression, each stage of compression requiring a corresponding amount of compression energy to compress the ammonia;

the improvement which comprises reducing the energy expended per unit of ammonia produced by maintaining the ammonia obtained substantially constant while reducing the overall compressor energy consumption by:

(i) providing heat exchange apparatus for cooling the reacted synthesis gas with ammonia refrigerant having a thermally conductive wall with an enhanced boiling surface on one side of such wall in at least the last stage of cooling such that the ammonia refrigerant is in contact with the said enhanced boiling surface during the indirect heat exchange; and (ii) cooling the reacted synthesis gas to essentially the same temperature T so as to obtain a substantially constant amount of ammonia condensation; and (iii) increasing the suction pressure in at least the first stage of the compressor so as to decrease the overall compressor energy consumption.

35. In a process for the production of ammonia comprising:

(a) compressing a hydrogen-nitrogen ammonia synthesis gas stream to a pressure greater than about 1800 psia;

(b) combining the compressed synthesis gas with a reacted synthesis gas stream containing hydrogen, nitrogen, and gaseous ammonia from step (i);

(c) passing a first portion of the combined stream to a heat exchanger which is in indirect heat exchange with a vapor phase stream containing hydrogen, nitrogen, and gaseous ammonia obtained from step (g) to cool the first portion of the combined stream;

(d) passing a second portion of the combined stream to at least one cooling stage cooled with ammonia refrigerant;

(e) recombining the cooled first and second portions of combined stream;

(f) passing the recombined stream to a final cooling stage to reduce the temperature of the recombined stream to a temperature $T_1$ and providing a mixture containing liquid ammonia, gaseous ammonia, hydrogen, and nitrogen;

(g) separating the liquid ammonia from the vapor portion of the mixture in a first separating zone to form a vapor phase of gaseous ammonia, hydrogen and nitrogen and a liquid ammonia phase;

(h) passing the vapor phase in indirect heat exchange with the first portion of the combined stream in accordance with step (c);

(i) reacting the vapor phase in the presence of an ammonia synthesis catalyst at conditions effecting conversion of the hydrogen and nitrogen to gaseous ammonia and form the reacted synthesis gas stream of step (b);

wherein the ammonia refrigerant in the cooling stages is provided by a compressor having at least two or more stages of compression;

the improvement which comprises reducing the energy expended per unit of ammonia produced by:

(i) providing at least the final ammonia refrigerant cooling stage with a thermally conductive wall having an enhanced boiling surface on the side which is in contact with the ammonia refrigerant said that the overall heat transfer coefficient is increased by a factor of at least 2.0 to 3.0;

(ii) reducing the temperature of the recombined stream to a temperature $T_2$ which is less than $T_1$ such that more ammonia is condensed;

(iii) increasing the amount of the first portion of the combined stream passed to the heat exchanger; and (iv) increasing the suction pressure to at least the first stage of the compressor.

* * * * *